Inventor
JAMES MARTIN
By [signature]
AGENT

May 29, 1962   J. MARTIN   3,036,796
EJECTION SEATS FOR AIRCRAFT
Filed March 25, 1958   4 Sheets-Sheet 4

Inventor
JAMES MARTIN
By Kurt Kelman
AGENT

United States Patent Office 3,036,796
Patented May 29, 1962

3,036,796
EJECTION SEATS FOR AIRCRAFT
James Martin, Southlands Manor, Southlands Road,
Denham, near Uxbridge, England
Filed Mar. 25, 1958, Ser. No. 723,705
Claims priority, application Great Britain Mar. 29, 1957
8 Claims. (Cl. 244—122)

This invention concerns improvements in or relating to ejection seats for aircraft wherein the seat comprises a frame and a seat bucket vertically adjustable on said frame (for example as described in United States Patent No. 2,836,222) to accommodate occupants, hereinafter called "airmen," of different body heights and to bring any particular airman into such a position that his head is properly located with respect to the head rest of the ejection seat and the line of vision from the aircraft. Moreover, where the seat is of the kind having a protective face screen, such as is described in United States Patent No. 2,467,763 for example, the adjustability of the seat enables the airman to be accommodated in a position which renders the handle of the face screen, which controls the ejection of the seat, readily available to him.

In such a seat, various operations have to be initiated either from the seat bucket or from the seat frame, or alternatively from either of these parts, and performed on the other part, and provision has to be made for the transmission of the necessary operating motion from the one to the other of such seat parts. This is particularly the case in connection with the holding means for the harness used in ejection seats and especially those seats of the kind made by the Martin-Baker Aircraft Co. Ltd. in which a safety or seat harness (hereinafter called "seat harness") is provided for the airman and which includes lap straps and shoulder straps, the lap straps being connected at their rear ends to the rear lower corners of the seat bucket by releasable locks and the shoulder straps being connected to the seat frame at about shoulder level by a further releasable lock.

In these ejection seats means are provided whereby, after the ejection of the seat in an emergency, a series of actions are automatically initiated including the deployment of a drogue parachute which is connected to the airman's parachute but is initially restrained from withdrawing the latter parachute, the release of the restraint and the consequent withdrawal of the airman's parachute, and the release of the seat harness locks to free the airman from the ejection seat. Seat and parachute harness lock control mechanisms of various types are described, for instance, in U.S. Patents Nos. 2,569,638 and 2,655,329 and British Patent No. 761,508.

Experience has shown that it is difficult to design simple and robust mechanism whereby one or more devices, e.g. one or more seat harness locks, on one of two relatively adjustable members, e.g. on the seat bucket or on the seat frame, can be instantly and positively operated from the other member. Although various arrangements such as a cable and parallel linkage systems have been used it is desirable that greater precision, positiveness and robustness should be provided in such mechanism because the release of the airman should, in an emergency, be effected virtually instantaneously and with the utmost reliability.

An object of this invention is therefore to provide in an ejection seat of the kind specified control mechanism operable from at least one of the relatively movable parts of the seat, e.g. the seat frame or the seat pan, to effect actuation of a member on the other part of the seat with positiveness and reliability in spite of the relative adjustability of the said two parts.

Although the invention is concerned particularly with improved harness lock release mechanism, it may nevertheless be applied to the operation of other control mechanism for use in ejection seats. Thus where leg restraining harness means are provided in the ejection seat as described, for example, in my co-pending United States patent application Serial No. 723,794, now U.S. Patent 2,944,774, control mechanism in accordance with this invention may be utilised for releasing the holding or retaining means of the leg restraining harness means, subsequent to the ejection of the seat from the aircraft. Similarly mechanism according to the invention may be employed for the release of the holding means controlling a "reach" strap connected to the seat harness and which, when released, permits the airman, whilst he is secured in the seat by the seat harness, to move forwardly in the seat when required; an early form of such a device is described, for example, in United States Patent No. 2,527,020.

According to this invention, there is provided an ejection seat for an aircraft, such seat comprising a seat frame and a seat bucket vertically adjustable along said frame, harness holding means on one of the relatively adjustable seat parts, control means on the other of such seat parts for releasing the harness holding means, and at least one telescopic torque shaft having one of its telescopically and drivingly interconnected parts journalled on one of the seat parts and another of such parts journalled on the other seat part to transmit operating movement from the control means on the one seat part to the holding means on the other seat part whilst leaving these seat parts free for relative adjustment in the general direction of the length of such shaft.

Further features of the invention will become apparent from the following description and claims.

In order that the nature of the invention may be more readily understood, certain embodiments of the same will now be described, by way of example, with reference to the accompanying drawings in which:

FIGURE 5 is a section on line V—V, FIGURE 4, but with the reach strap illustrated;

FIGURE 6 is a section on line VI—VI, FIGURE 2, through one of the seat harness locks fitted in the seat bucket of the ejection seat.

Figure 1:
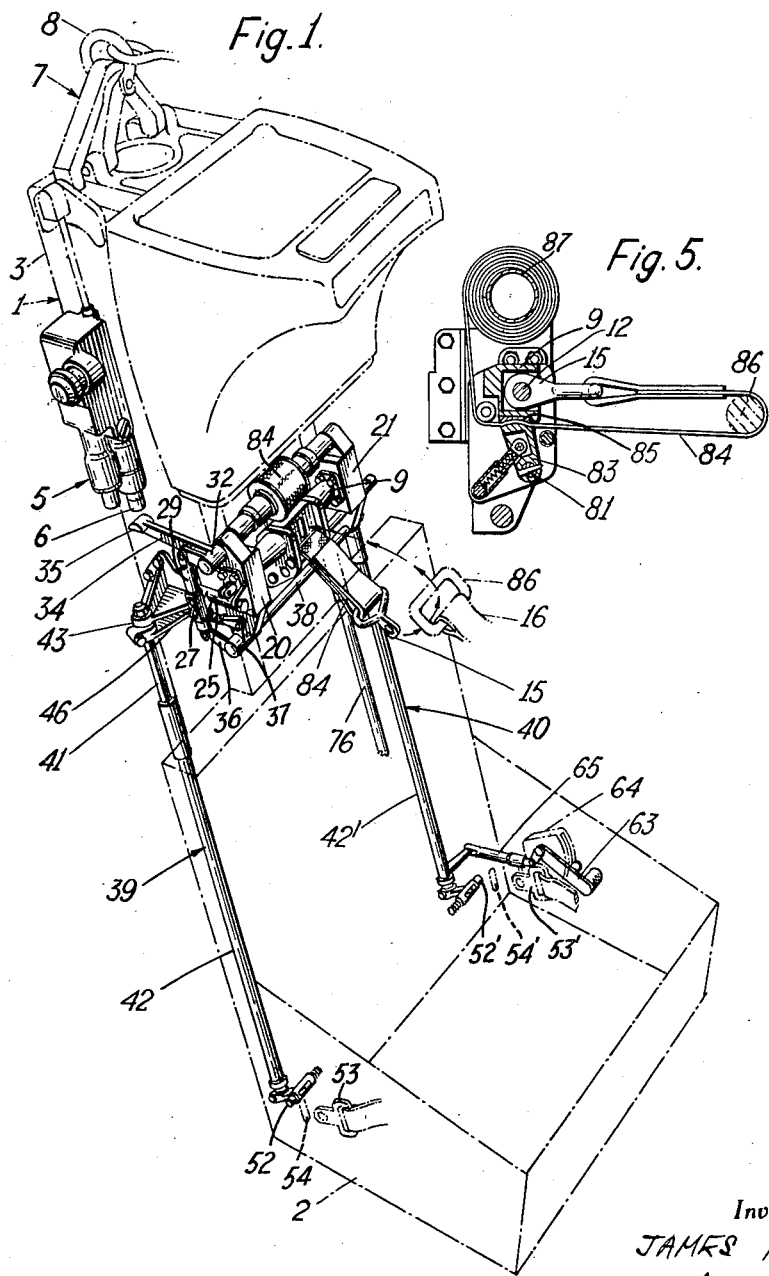
FIGURE 1 is a front perspective view showing this invention applied to an aircraft ejection seat, the seat frame, the seat bucket and a head rest being shown in chain dotted lines.

In the embodiment of the invention shown in the drawings, 1 is the frame of an ejection seat (shown in chain dotted lines) of the kind manufactured by the Martin-Baker Aircraft Co. Ltd. and upon which is mounted a seat bucket 2 adapted for vertical adjustment on the frame to vary the height of the seat with respect to the frame for the reasons hereinbefore explained.

The seat frame 1 comprises two upright side beams 3 and 4. The seat bucket 2 is movable along the beams for adjustment of seat height. To the upper part of the beam 3 is fixed a time delay mechanism 5 of the form described in United States Patent No. 2,708,083 and which is furnished with a spring loaded shackle release plunger 6 (normally retained in a "cocked" position). The upper end of this plunger co-operates with shackle release mechanism 7 for releasing a drogue parachute cable, not shown, from a shackle 8 (mounted between the upper ends of the beams 3 and 4) at an appropriate stage during the launching of the ejection seat from the aircraft. The shackle release plunger 6 also serves to initiate certain other operations during the ejection of the seat, inclusive of the release of the seat harness locks and, if provided, leg restraining line retaining latches, as hereinbefore described. The present invention is not concerned with the time delay or shackle mechanism per se.

A housing 9 is horizontally positioned across the upper parts of the side beams 3 and 4 of the seat frame 1, and at about the position at which the shoulders of an airman sitting in the ejection seat would be located. The housing 9 is fixed between forwardly projecting parts of a pair of brackets 20, 21, secured respectively to the beams 3 and 4. As may be best seen in FIG. 4, the housing 9 has, in one end thereof, a longitudinal bore 10 in which is slidably mounted a plunger 11 having at its inner end a latch head 12 adapted normally to protrude, under the action of a compression spring 13, into a transverse slot 14 provided in the housing 9 for the reception of an apertured lug 15 (see FIG. 1) which may be directly connected to the shoulder straps 16 of the seat harness of the ejection seat, or as hereinafter described, to a "reach" strap 84 to which the shoulder straps are releasably attached by means of a buckle 86, the lug being adapted to be plugged into the slot 14 and to be locked therein by the latch head 12.

The spring 13 bears at one end upon a fixed collar 17 on the latch plunger 11 and at the other end against a sleeve 18 retained in the bore 10 by a cover plate 19 fixed to the outside of the bracket 20.

The assembly comprising the housing 9, latch head 12 and plunger 11 which serves to hold the shoulder harness will hereinafter be referred to as the shoulder harness lock.

The plunger 11 protrudes outwardly beyond the bracket 20 and plate 19 and at this protruding end is bifurcated and carries in this bifurcation a roller 22 against which engages one arm 23 of a lever 24 pivotally mounted upon a horizontal bolt 25 carried by lugs 26 on bracket 20. The lever 24 has a second and dependent arcuate arm 27 laterally spaced from arm 23 (see also FIG. 2) and protruding into a longitudinal slot 28 in a vertically arranged link 29 carrying in said slot a roller 30 adapted to engage against the lever arm 27 when the link is moved downwardly, thereby to cause the lever 24 to swing up on its pivot 25 and effect, through its arm 23, the withdrawal of the latch head 12 to free the lug 15.

Figure 2:
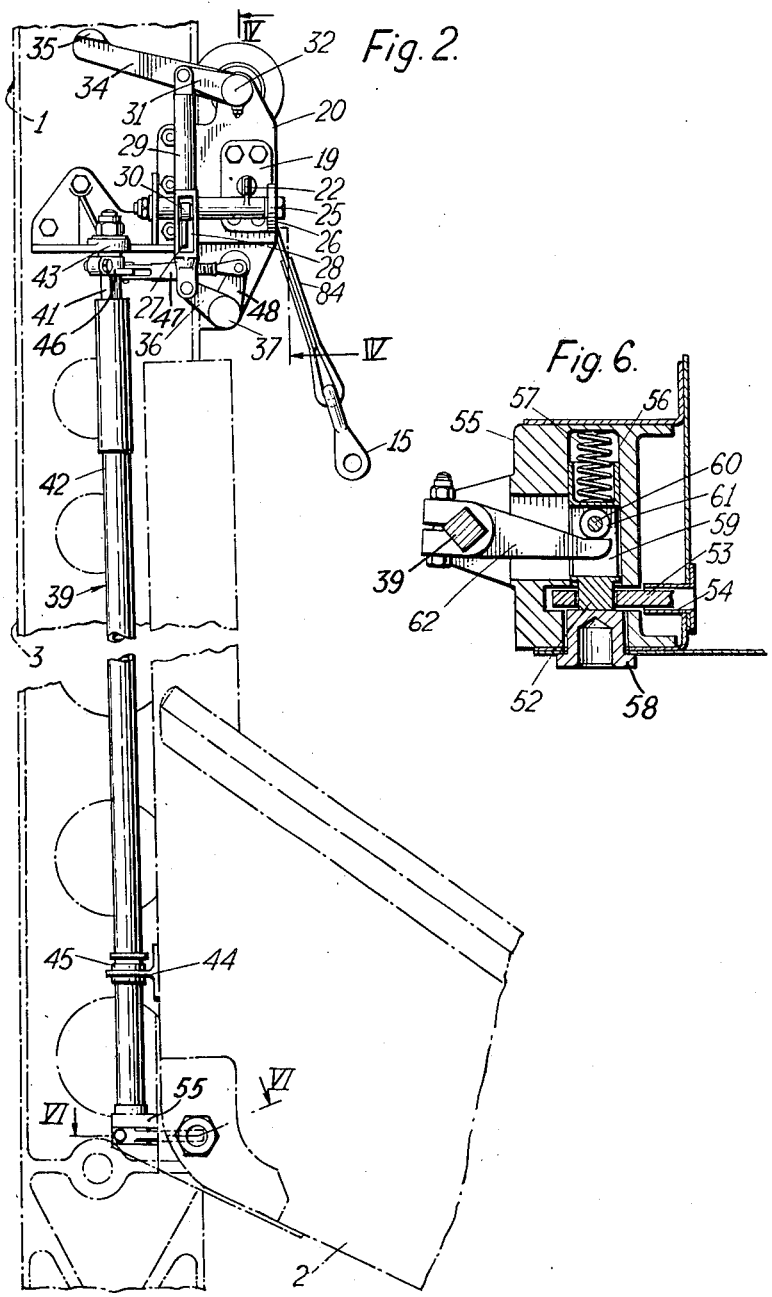
FIGURE 2 is a side elevation of the apparatus shown in FIGURE 1.
Figure 4:
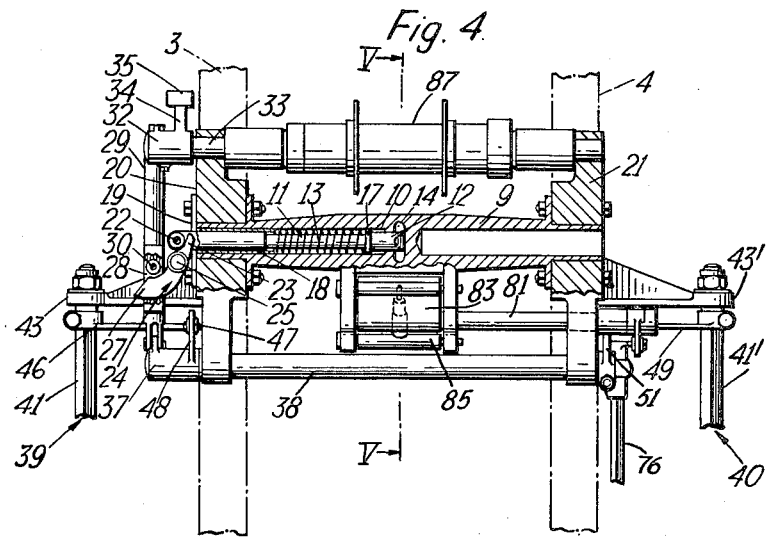
FIGURE 4 is a part vertical section on line IV—IV, FIGURE 2, the reach strap being omitted.

As best seen in FIGS. 2 and 4, the upper end of the link 29 is pivoted to one end of a crank arm 31 radiating from a boss 32 fixed upon a cross shaft 33 parallel to the housing 9 and extending horizontally between, and journalled in, the upper parts of the brackets 20 and 21. In addition to the crank arm 31, the boss 32 has integrally formed thereon an actuating lever arm 34, the free end 35 of which is adapted to be engaged and forcibly depressed by the shackle release plunger 6 when this is released.

The lower end of the link 29 is pivoted to the outer end of a crank arm 36 formed on a boss 37 fixed to an end of a second cross shaft 38 extending between, and journalled in, dependent parts of the brackets 20 and 21.

Figure 3:
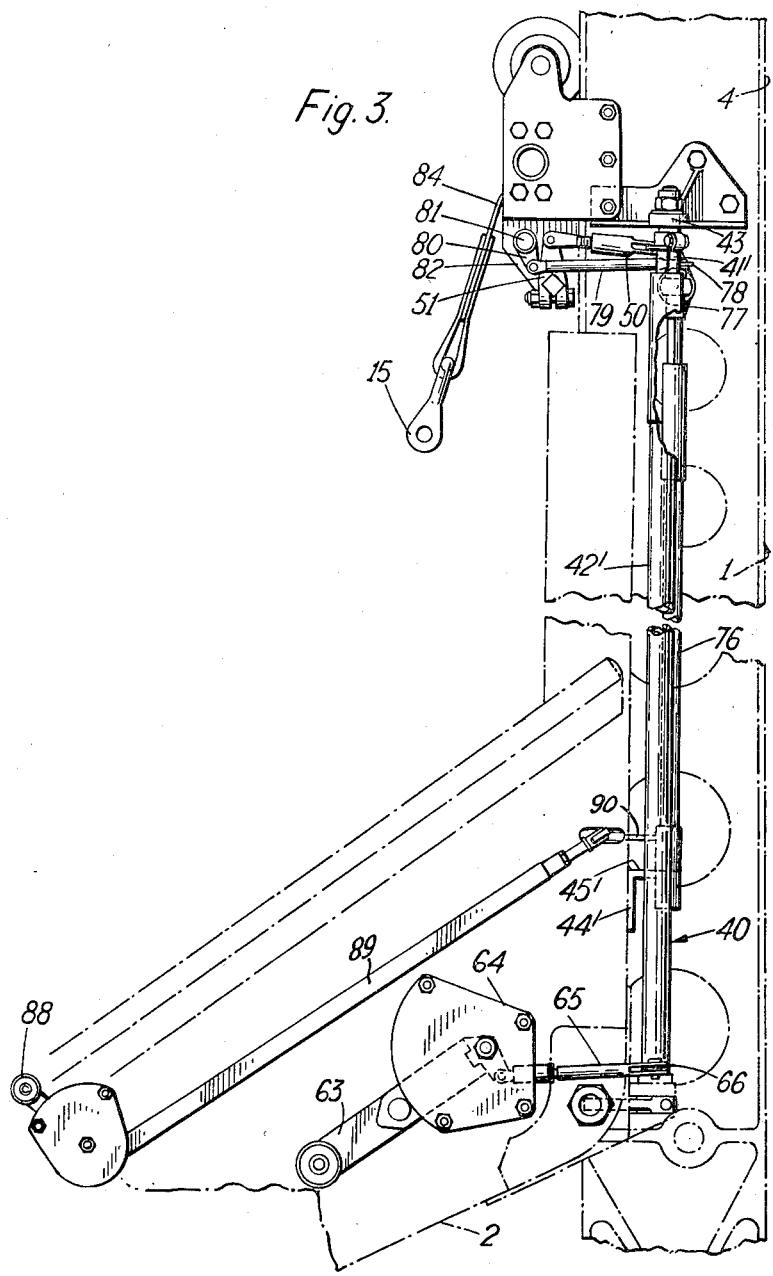
FIGURE 3 is a side elevation of the apparatus shown in FIGURE 1 seen from the opposite side to that shown in FIGURE 2.

As best seen in FIGS. 2 and 3, along each of the side beams 3 and 4 of the seat frame 1 is arranged a telescopic torque shaft 39 and 40, respectively comprising a rigid upper part 41, 41' of non-circular, and preferably square, cross-sectional form slidably fitting in a corresponding axial bore of a rigid lower and colinear part 42, 42', so that rotation of either of the shaft parts transmits corresponding rotation to the other shaft part.

The upper parts 41 and 41' of the two telescopic torque shafts 39 and 40 are respectively journalled for free rotation without axial movement in brackets 43 and 43' secured one to each of the side beams 3 and 4 of the seat frame 1, whilst the lower ends of the shaft parts 42 and 42' are respectively journalled for free rotation in brackets 44, 44' fixed to the rear of the seat bucket, the parts 42 and 42' of the torque shaft being restrained from axial movement relative to the seat bucket by pairs of collars 45, 45' engaging opposite sides of the brackets 44, 44'.

As best seen in FIGS. 2 and 4, on the upper end of the part 41 of the torque shaft 39 is fixed one end of a horizontally arranged crank arm 46 of which the other end is connected by a link 47 to the free end of a crank arm 48 formed integrally with a boss 37 carrying the arm 36 previously referred to.

As shown in FIGS. 3 and 4, upper part 41' of the torque shaft 42' has fixed thereto one end of a crank arm 49 (very similar to the lever 46 hereinbefore described) which has its other end connected by a link 50 to a crank arm 51 fixed upon the end of the cross shaft 38 remote from that carrying the boss 37 and its crank arms 36 and 48. Thus any rotation of either of the telescopic torque shafts 39 and 40 will produce similar but opposite rotational movement in the other shaft.

In the rear lower corners of the seat bucket 2 are mounted a pair of seat harness holding locks comprising plungers 52 and 52' respectively for co-operation with apertured lugs 53 and 53' secured to lap straps of the seat harness, the said lugs being adapted to be plugged into slots 54, 54' in the back of the seat bucket for releasable interengagement with latch heads of the plungers 52 and 52' of the harness locks.

As the two seat harness locks mounted in the rear corners of the seat bucket are similar but of reverse hand, only one of them will be described in detail with reference to FIGURE 6. As will be seen, the lock comprises a housing 55 secured to the seat bucket and having a horizontal bore 56 parallel to the back of the seat bucket. The plunger 52 is slidably mounted in the bore 56 and is urged towards the outer side of the seat by means of a compression spring 57 located between the inner end of the bore 56 and the inner end of the plunger so that the latter is normally urged against a plug 58 secured in the outer end of the housing bore 56, and into a harness lug-retaining position.

The plunger 52 is furnished with a longitudinal slot 59 in which is located a transverse pin 60 carrying a roller 61 for engagement with the tip of a lock release lever. One of these levers 62, 62' is provided for each of the harness lock plungers 52, 52' and the levers are respectively fixed, for movement in substantially horizontal planes, to the lower ends of the torque shaft parts 42, 42', the arrangement being such that, when the torque shafts 39 and 40 are rotated to withdraw the shoulder harness lock plunger 11, the plungers 52 and 52' of the seat bucket harness locks are simultaneously withdrawn.

It will thus be seen that, on the operation of the shackle release plunger 6 and on the plunger striking and forcibly depressing the actuating lever 34, the link 29 will be caused to descend and in doing so will withdraw the plunger 11 of the shoulder harness lock, and will simultaneously cause rotation of the cross shaft 38 and consequently of the torque shafts 39 and 40 which will effect the withdrawal of the seat bucket harness lock plungers 52 and 52', thus completely freeing the seat harness from the seat, this release being effected positively and irrespective of the relative situation of the seat bucket 2 with regard to the seat frame 1.

It will be apparent that when the shoulder harness lock plunger 11 is withdrawn as hereinbefore described, the lug 15 will be released thus leaving the reach strap 84 free for withdrawal from the buckle 86 and disconnection from the seat harness.

Figure 7:
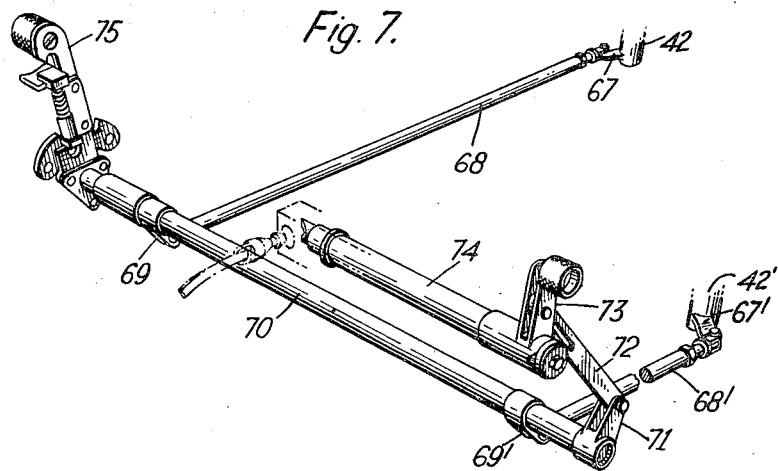
FIGURE 7 shows in perspective an extension of the mechanism illustrated in FIGURE 1 for the operation of leg restraining means for use with the ejection seat.

To provide an over-riding manual control so that all the seat harness locks may be simultaneously released manually by the airman should the automatic time delay mechanism 5 fail to operate, a manual control lever 63 (see FIG. 3) is provided and is pivotally mounted in a housing 64 fixed to one side of the seat bucket, this control lever being connected by a link 65 to a crank arm 66 secured to the lower end of the part 42' of the torque shaft 40. Thus movement of the lever 63 in the appropriate direction effects the release of all the seat harness locks simultaneously, the operating forces being transmitted in this case through the torque shafts from the lower ends thereof instead of from the upper ends thereof as in the case of automatic operation of the shafts. The lever 63 preferably has catch means to prevent it from being accidentally operated.

Where the ejection seat is furnished with leg restraining harness means of the character hereinbefore referred to and the holding means of which is to be released simultaneously with the seat harness locks then (as described and claimed in my co-pending application Serial No. 723,794, of even date, the lower parts 42 and 42' of the torque shafts 39 and 40 may (as shown in FIGURE 7) be furnished respectively with additional crank arms 67 and 67' connected by links 68 and 68' to crank arms 69 and 69' on a transverse shaft 70 journalled at the front of the seat bucket and having fixed thereon a further crank arm 71 connected by a link 72 and a pin and slot connection with a lever 73 mounted on a leg line holding or retaining latch plunger 74 and adapted to withdraw the latter on the crank arm 73 being operated either by direct manual action or from the torque shafts 39 and 40. A manual over-ride release lever 75 is also preferably provided on the shaft 70 to enable this to be operated by hand in the event of the automatic mechanism failing to function, a lost motion connection being made between the lever 75 and the shaft 70 to permit this shaft to operate under the manual actuation of the hand lever 73 or the automatic action of the torque shafts 39 and 40.

It will be apparent from the above description and appended drawings that by the use, in an ejection seat constructed according to this invention, of the telescopic torque shafts 39 and 40 arranged with their axes lying in the general direction of relative adjustment of the seat frame 1 and seat bucket 2, provision is made for the positive manual or automatic releasing of the various harness holding devices or locks irrespective of the relatively adjusted positions of the seat bucket 2 and the seat frame 1 and that this releasing mechanism is not operationally disturbed by adjustment of the seat bucket on the seat frame. It will further be apparent that the release of the seat harness locks can readily be manually effected if desired and that if the ejection seat is to include leg restraining harness means, the retaining or holding devices of this harness can be released simultaneously with the seat harness locks either automatically or manually whilst being independently manually releasable.

Whilst the lug 15 may be connected directly to the shoulder straps of the seat harness, alternatively the shoulder straps may (as shown in FIGURES 1 and 5) be connected to a buckle 86 through which is threaded the flexible reach strap 84 designed to permit the airman to move forward in his seat when he so desires but which normally holds him firmly back in his seat.

In this arrangement the reach strap 84 is carried by spring reel 87 mounted above the housing 9 and which always tends to wind up the strap 84, the latter being carried downwards from the reel and through a gripping device comprising a fixed jaw or anvil 85 and a spring biased pivoted jaw 83 fixed upon a horizontal shaft 81 and which normally serves to clamp the strap 84 against forward withdrawal from the reel 87 but which can be released to free the reach strap for such forward movement.

After passing through said gripping device, the strap 84 is threaded through the buckle 86 of the shoulder harness as above described and the free end of the reach strap is secured in the slot 14 by the shoulder harness lock plunger 11, the lug 15 being, in this case, carried by the free end of the strap 84.

The reach strap releasing movement of the pivoted jaw 83 is effected from a manually operable control member 88 on the seat bucket which actuates rotation of an additional telescopic torque shaft 76 by means of a link 89 and a crank arm 90. The two parts of the shaft 76 are respectively journalled in the seat bucket 2 and in a bracket 77 on the beam 4 of the seat frame, the upper part of the shaft being furnished with a crank arm 78 connected to one end of a link 79 attached, at its other end, to a crank arm 80 fixed upon the shaft 81 carrying the said pivotal clamping jaw and journalled in the bracket 21 and in a downward extension 82 of the hereinbefore mentioned housing 9, rotation of the torque shaft 76 in one direction serving to swing the pivotal clamping jaw 83 away from the fixed jaw or anvil 85.

Although the torque shafts 39 and 40 are described herein as comprising two parts sliding one within the other in a truly telescopic manner, it should be understood that the shafts may each comprise more than two such parts and moreover may be constructed in ways other than that described—they could for instance comprise colinear bars slidable one upon the other or colinear bars or rods having a pin and slot connection: however, whatever the form adopted to render the shafts variable in length whilst remaining capable of torque transmission, it is intended that the term "telescopic" used herein should cover all these possible alternative forms of shafts.

I claim:

1. An aircraft ejection seat comprising, in combination: a first seat part constituting a seat frame; a second seat part constituting a seat bucket, the second seat part being movable relative to said first seat part in a predetermined direction; an airman's seat harness; harness holding means on at least one of said seat parts for releasably securing the seat harness to said one seat part; a torque transmitting shaft comprising two coaxial parts each journaled on a respective one of said seat parts for rotation about an axis extending in said direction and engaging the other shaft part for joint rotation, the shaft parts being axially movable relative to each other; control means being mounted on the other one of said seat parts; motion transmitting means connecting the shaft part journaled on said one seat part to said harness holding means for actuating release thereof; and motion transmitting means connecting the shaft part journaled on said other seat part to said control means for rotation of said shaft by said control means, said shaft transmitting operating movement from said control means on the other seat part to said harness holding means on the one seat part while permitting the relative adjustment of said seat parts in the axial direction of the shaft.

2. The ejection seat of claim 1, further comprising manually operable emergency release means movably mounted on said seat bucket for rotating the torque transmitting shaft to release the harness holding means.

3. The ejection seat of claim 1, wherein said harness holding means comprises a spring-biased latch member, said harness having a strap with a lug releasably secured by said latch member under the bias of its spring; and further comprising an actuating lever cooperating with said latch member for moving the same against the spring bias into a released position; and motion-transmitting means connecting the torque shaft to said lever.

4. An aircraft ejection seat comprising, in combination, a first seat part constituting a seat frame; a second seat part constituting a seat bucket, the second seat part being movable relative to said first seat part in a predetermined direction; an airman's seat harness including lap strap means; harness holding means on at least one of said seat parts for releasably securing the seat harness to said seat part and including a pair of locks for holding said lap strap means, said locks being positioned at respective sides of the seat bucket; a pair of torque transmitting shafts, each comprising two coaxial parts journaled on a respective one of said seat parts for rotation about an axis extending in said direction and engaging the other shaft part for joint rotation, the shaft parts being axially movable relative to each other; first motion transmitting means on said seat bucket connecting one part of each of said shafts to a respective one of said locks for actuating release of said lap strap means upon rotation of the respective shaft; a rotatable cross shaft on the seat frame; second motion transmitting means on the seat frame connecting the other respective parts of said torque transmitting shafts to said cross shaft for joint rotation of said torque transmitting shafts with said cross shaft; and control means for actuating rotation of said cross shaft.

5. The ejection seat of claim 4, wherein said harness has shoulder straps; said harness holding means includes a third lock for holding said shoulder straps, said third lock being positioned on said seat frame; and motion transmitting means actuated by said control means and operable to release said third lock.

6. The ejection seat of claim 4, wherein said control means includes a plunger linearly movable on said seat frame and connecting means between said plunger and said cross shaft for translating the linear movement of the plunger into a rotary movement of the cross shaft whereby the torque transmitting shafts are rotated for operation of said pair of locks to release the lap strap means.

7. The ejection seat of claim 6, wherein said last-mentioned connecting means includes an actuating lever pivotally mounted on the seat frame and operable by said plunger; and means connecting the actuating lever to the cross shaft.

8. The ejection seat of claim 4, wherein said harness has shoulder straps; and said harness holding means includes a reach strap secured to said shoulder straps, and gripping means for adjustably holding said reach strap on said seat frame, said gripping means including a movable clamping jaw on said frame for gripping said reach strap, a manually operable member on said seat bucket, and another torque transmitting shaft having two shaft parts respectively journaled on each of said seat parts for coaxial rotation about an axis extending in said direction, one shaft part engaging the other shaft part for joint rotation and being axially movable relative thereto, said last-named torque transmitting shaft being connected between the manually operable member and the clamping jaw to transmit a jaw release movement from the manually operable member to the clamping jaw.

References Cited in the file of this patent

UNITED STATES PATENTS

| | | |
|---|---|---|
| 2,569,638 | Martin | Oct. 2, 1951 |
| 2,638,293 | Lindstrom | May 12, 1953 |

FOREIGN PATENTS

| | | |
|---|---|---|
| 538,142 | Belgium | May 31, 1955 |